United States Patent
Motohashi et al.

(10) Patent No.: US 10,212,388 B2
(45) Date of Patent: Feb. 19, 2019

(54) VIDEO IMAGING APPARATUS

(71) Applicant: SMK Corporation, Tokyo (JP)

(72) Inventors: Kazutaka Motohashi, Chiba (JP); Motohiro Kawasaki, Tokyo (JP)

(73) Assignee: SMK Corporation, Tokyo (JP)

( * ) Notice: Subject to any disclaimer, the term of this patent is extended or adjusted under 35 U.S.C. 154(b) by 245 days.

(21) Appl. No.: 15/246,556

(22) Filed: Aug. 25, 2016

(65) Prior Publication Data
US 2017/0237937 A1    Aug. 17, 2017

(30) Foreign Application Priority Data

Feb. 16, 2016  (JP) ................. 2016-027416

(51) Int. Cl.
*H04N 7/00* (2011.01)
*H04N 7/10* (2006.01)
(Continued)

(52) U.S. Cl.
CPC ............ *H04N 7/102* (2013.01); *B60R 1/00* (2013.01); *H04N 5/217* (2013.01); *H04N 5/23203* (2013.01); *H04N 5/23293* (2013.01); *H04N 5/247* (2013.01); *H04N 5/77* (2013.01); *H04N 5/911* (2013.01); *H04N 7/108* (2013.01); *H04N 7/183* (2013.01); *B60R 2300/802* (2013.01); *H04N 5/378* (2013.01); *H04N 2005/2255* (2013.01)

(58) Field of Classification Search
CPC .................................................... H04N 7/102
USPC ........................................................ 348/148
See application file for complete search history.

(56) References Cited

U.S. PATENT DOCUMENTS 5,686,800 A * 11/1997 Kim ................ H04N 3/227
                                                    315/371
6,130,716 A * 10/2000 Hirasawa .......... H04N 5/23212
                                                    348/347
(Continued)

FOREIGN PATENT DOCUMENTS

JP        2002185853 A       6/2002
JP        2008035415 A *     2/2008    ........... H04N 5/2351
(Continued)

OTHER PUBLICATIONS

Office Action issued for counterpart Japanese Application 2016-027416, issued by the Japan Patent Office dated Nov. 21, 2017.

*Primary Examiner* — Dave Czekaj
*Assistant Examiner* — Shanika M Brumfield

(57) ABSTRACT

In a video imaging apparatus, a camera module includes the imaging unit and an imaging control unit that controls the imaging operation of the imaging unit according to imaging control values, and the imaging apparatus main body connected to the camera module via a connection cable capable of bidirectional communication includes an image signal processing unit that outputs frame images of a video in sequence from the imaging signals and generates the imaging control values for controlling imaging operation of the imaging unit from the imaging signals. The imaging unit can determine whether the imaging control values input from the image signal processing unit via the connection cable are abnormal imaging control values under influence of noise.

5 Claims, 4 Drawing Sheets

(51) Int. Cl.
*B60R 1/00* (2006.01)
*H04N 5/217* (2011.01)
*H04N 5/232* (2006.01)
*H04N 5/911* (2006.01)
*H04N 7/18* (2006.01)
*H04N 5/77* (2006.01)
*H04N 5/247* (2006.01)
*H04N 5/378* (2011.01)
*H04N 5/225* (2006.01)

(56) References Cited

U.S. PATENT DOCUMENTS

| | | | |
|---|---|---|---|
| 9,509,896 B2* | 11/2016 | Umezawa | H04N 5/23212 |
| 2005/0270408 A1* | 12/2005 | Kwon | H04N 5/23212 |
| | | | 348/345 |
| 2008/0055458 A1 | 3/2008 | Moriya | |
| 2008/0177137 A1* | 7/2008 | Matsui | A61B 1/04 |
| | | | 600/109 |
| 2013/0241950 A1* | 9/2013 | Mihara | G09G 3/20 |
| | | | 345/589 |
| 2013/0329118 A1* | 12/2013 | Hongu | H04N 5/23209 |
| | | | 348/345 |
| 2014/0247355 A1* | 9/2014 | Ihlenburg | H04N 7/18 |
| | | | 348/148 |
| 2016/0198089 A1* | 7/2016 | Motohashi | H04N 5/23238 |
| | | | 348/36 |

FOREIGN PATENT DOCUMENTS

| | | |
|---|---|---|
| JP | 2015-136093 A | 7/2015 |
| JP | 2015-161893 A | 9/2015 |

* cited by examiner

VIDEO IMAGING APPARATUS

CROSS REFERENCE TO RELATED APPLICATION

The contents of the following Japanese patent application are incorporated herein by reference,
Japanese Patent Application No. 2016-027416 filed on Feb. 16, 2016.

FIELD

The present invention relates to a video imaging apparatus in which a camera module imaging a video and an imaging apparatus main body outputting the imaged video are connected together via a connection cable, more specifically to a video imaging apparatus that outputs a video under no influence of noise even when the connection cable is laid in noisy environments.

BACKGROUND

The basic configuration of a typical representative video imaging apparatus 100 includes: an imaging unit 101 that images a video and generates imaging signals indicative of frame images of the video; an ISP (image signal processor) 102 that subjects the imaging signals to image signal processing to create the frame images of the video in sequence and, in the course of the creation, generates from the imaging signals imaging control values for controlling the imaging operation of the imaging unit 101, and performs a feedback control on the imaging operation of the imaging unit 101 according to the imaging control values; and a video output unit 103 that outputs the frame images of the video created by the ISP 102 in a video format capable of being reproduced on a monitor 105 as illustrated in FIG. 3. These components are arranged in a single imaging apparatus main body 104 (refer to JP-A-2015-161893).

The imaging control values generated by the ISP 102 from the imaging signals are auto white balance control values, auto exposure control values, or auto focus control values, or the like. The imaging operation of the imaging unit 101 is controlled by the imaging control values to subject the created frame images to auto white balance (AWB) by which to reproduce optimum colors under various different light sources, auto exposure (AE) by which to provide clear image quality according to brightness, and auto focus (AF) by which to obtain correct focus under various conditions. These imaging control values are acquired through comparison among all pixel data in the frame images indicated by the imaging signals. Accordingly, as the imaging element of the imaging unit 101 is higher in performance and the pixels of one frame image increase in number, the amount of data to be compared grows and leads to a rise in the costs of data mining processes such as filtering, scaling, and cropping for obtaining the imaging control values, and the load of processing from input of the imaging signals to the output of the frame images by the ISP 102 increases. Further, in the course of creating the frame images from the imaging signals, the ISP 102 is required to perform various signal processing operations such as noise reduction, shading correction, contour enhancement, and various effect functions. Therefore, the ISP 102 needs to include a microcomputer that consumes a large amount of power and has a complicated structure for high performance.

Meanwhile, in monitoring cameras mounted in medical endoscopes or vehicles, cameras for event data recorders, and others, the imaging unit needs to be arranged at a position distant from a monitor reproducing a video to image the video in a required imaging field of view. In a video imaging apparatus 110 described in JP-A-2015-136093, a camera module 113 including an imaging unit 112 is separated from an imaging apparatus main body 111, a complicated and large-sized ISP 115 with high power consumption is arranged on the imaging apparatus main body 111 side, and the camera module 113 and the imaging apparatus main body 111 are connected together via a LVDS (low voltage differential signaling) cable 114 as illustrated in FIG. 4.

According to the video imaging apparatus 110, the ISP 115 is not arranged in the camera module 113, and therefore the camera module 113 can be simplified and small-sized to operate with low power consumption.

The imaging signals output from the camera module 113 to the ISP 115 of the imaging apparatus main body 111 via the LVDS cable 114 are unprocessed imaging signals not yet subjected to the foregoing signal processing or de-mosaic processing for creating full-color images (hereinafter, called raw data). Accordingly, the data amount of the imaging signals is about ½ of that of the frame images output from the ISP 115 in YUV format, for example, and the time taken for transferring the imaging signals via the LVDS cable 114 at the same transfer speed is about ½ of that in the case where the ISP 115 is built in the camera module 113. Therefore, even when the LVDS cable 114 is laid in environments with frequent occurrence of noise, for example, in a vehicle, the capability of superimposition of noise on the transferred imaging signals reduces to about ½. Accordingly, the imaging signals are less influenced by influence of noise in unfavorable connection environments.

SUMMARY

In the typical video imaging apparatus 100 described in JP-A-2015-161893, the ISP 102 is built in the imaging apparatus main body 104 with the imaging unit 101. The imaging apparatus main body 104 thus is large-sized and consumes a large amount of power, and therefore there is a limitation on the installation position of the imaging apparatus main body 104. When the video is output to a monitor via the connection cable, the data amount of the video transferred by the connection cable is large and a lot of time is required to transfer the data. Accordingly, the data is likely to be influenced by noise occurring during the transfer.

Further, in a video imaging system such as an in-vehicle camera in which videos are obtained by a plurality of imaging units imaging in different imaging fields of view and are composited and displayed on a monitor, each of the imaging apparatus main bodies 104 with the imaging units 101 needs to include the expensive ISP 102, thereby making the entire system expensive.

In the video imaging apparatus 110 illustrated in FIG. 4 in which the camera module 113 and the imaging apparatus main body 111 are connected together via the LVDS cable 114 and the ISP 115 is arranged in the imaging apparatus main body 111, the imaging operation of the imaging unit 112 in the camera module 113 is controlled according to the imaging control values generated by the ISP 115, and the ISP 115 outputs the imaging control signals for controlling the imaging operation of the imaging unit 112 via the LVDS cable 114 capable of bidirectional communication.

However, when the imaging control signals do not reach the imaging unit 112 or the imaging control signals are generated from abnormal imaging control values under the influence of noise while the ISP 115 outputs the imaging control signals via the LVDS cable 114, the imaging unit 112 may stop imaging operation or output the imaging signals in abnormal imaging operation. The video imaging apparatus 110 has no measure for correcting the error or protecting the signals from the error. As a result, the imaging signals output from the imaging unit 112 stop temporarily or the imaging signals resulting from the abnormal imaging control values are input into the ISP 115. Accordingly, the imaging apparatus main body 111 stops some of the frame images to be successively output, or outputs frame images under incorrect white balance, exposure, or focus as video.

The present invention is devised in light of the foregoing known problems. An objective of the present invention is to provide a video imaging apparatus in which, even when a camera module including an imaging unit and an imaging apparatus main body outputting a video are connected in noisy environments, the two are less influenced by noise, and imaging operation of the imaging unit is not controlled with abnormal imaging control values.

To attain the foregoing objective, a video imaging apparatus described in a first aspect is a video imaging apparatus including: an imaging unit that images a video and outputs imaging signals indicative of frame images of the video in sequence as a stream; an image signal processing unit that creates and outputs the frame images in sequence from the imaging signals and generates an imaging control value for controlling imaging operation of the imaging unit from the imaging signals; and a video output unit that outputs to a monitor the video with a series of the frame images output in sequence from the image signal processing unit. A camera module includes the imaging unit and an imaging control unit that controls the imaging operation of the imaging unit according to the imaging control value. The imaging apparatus main body connected to the camera module via a connection cable capable of bidirectional communication includes the image signal processing unit and the video output unit. The imaging unit of the camera module outputs the imaging signals to be output in sequence to the image signal processing unit of the imaging apparatus main body via the connection cable. The imaging control unit of the camera module controls the imaging operation of the imaging unit according to the imaging control value output from the image signal processing unit of the imaging apparatus main body via the connection cable.

The camera module outputs the unprocessed imaging signals from the imaging unit to the image signal processing unit of the imaging apparatus main body via the connection cable capable of bidirectional communication, the imaging apparatus main body outputs the imaging control value generated from the imaging signals to the imaging control unit of the camera module via the connection cable, and the imaging control unit performs a feedback control on the imaging operation of the imaging unit according to the imaging control value.

In the video imaging apparatus described in a second aspect, the camera module includes a storage device that stores primarily the imaging control value with which the imaging operation of the imaging unit is controlled by the imaging control unit, and when determining that the imaging control value output from the image signal processing unit via the connection cable is an abnormal value, the imaging control unit controls the imaging operation of the imaging unit according to the imaging control value read from the storage device, instead of the abnormal imaging control value.

When the imaging control value output from the imaging apparatus main body to the imaging control unit of the camera module becomes abnormal under the influence of noise, the imaging control unit reads from the storage device the imaging control value under no influence of noise output immediately before from the image signal processing unit, and controls the imaging operation of the imaging unit according to the imaging control value under no influence of noise, instead of the abnormal imaging control value.

In the video imaging apparatus described in a third aspect, the imaging control value is at least one of an auto white balance control value, an auto exposure control value, and an auto focus control value.

When the auto white balance control value, the auto exposure control value, or the auto focus control value output from the imaging apparatus main body to the imaging control unit of the camera module via the connection cable becomes abnormal under the influence of noise, the imaging control unit ignores the abnormal imaging control value.

In the video imaging apparatus described in a fourth aspect, when a plurality of imaging control values is input via the connection cable within a control cycle during which the imaging unit is controlled according to the imaging control value, the imaging control unit ignores some of the input imaging control values.

Even when the communication speed of the imaging control values output to the imaging control unit via the connection cable exceeds a control speed at which the imaging operation of the imaging unit is controlled, the imaging control unit does not overflow with the imaging control values.

In the video imaging apparatus described in a fifth aspect, the camera module installed at part of a vehicle for imaging the periphery of the vehicle and the imaging apparatus main body installed at the periphery of a monitor mounted around the driver's seat of the vehicle are connected together via a LVDS cable capable of bidirectional communication.

The imaging signals to be output from the camera module to the image signal processing unit of the imaging apparatus main body are output via the LVDS cable in a shorter time than the image signals of the frame images output from the image signal processing unit, and thus are less influenced by noise.

When the imaging control value output from the imaging apparatus main body to the imaging control unit of the camera module via the LVDS cable becomes abnormal under the influence of noise, the imaging control unit ignores the abnormal imaging control value.

In the video imaging apparatus described in a sixth aspect, imaging units in a plurality of camera modules installed at respective parts of the vehicle for imaging the periphery of the vehicle in different imaging fields of view are connected to the image signal processing unit of the imaging apparatus main body via LVDS cables capable of bidirectional communication.

The imaging operations of the imaging units in the plurality of camera modules are controlled according to the imaging control values generated by the single image signal processing unit for the respective camera modules.

The frame images of the video obtained by compositing the imaging signals of the periphery of the vehicle imaged in the different imaging fields of view can be generated and output in sequence from the imaging apparatus main body.

According to the first aspect of the invention, even when the communication data superimposed on the imaging signals and transmitted from the camera module to the imaging apparatus main body via the connection cable and the imaging control value output from the imaging apparatus main body to the imaging control unit of the camera module via the connection cable become abnormal under the influence of noise, the imaging control unit can ignore the abnormal imaging control value.

The imaging signals transmitted from the camera module to the image signal processing unit of the imaging apparatus main body is raw data that is not subjected to signal processing for creation of frame images of the video or de-mosaic processing for creation of full-color images. Accordingly, the amount of the data is smaller than that of the frame images of the video output from the image signal processing unit, and the data is sent out via the connection cable in a short time and is less influenced by incidental noise.

The camera module has a simple structure without the image signal processing unit and operates with low power consumption. Accordingly, there is no need for the use of a thick power line for the connection cable or there is no limitation on the installation place of the camera module.

According to the second aspect of the invention, even when the imaging control value output from the imaging apparatus main body to the imaging control unit of the camera module via the connection cable becomes abnormal under the influence of noise, the imaging control unit ignores the abnormal imaging control value and controls the imaging operation of the imaging unit according to the imaging control value under no influence of noise, and therefore the frame images are not mixed in part of the video.

According to the third aspect of the invention, even when the auto white balance control value, the auto exposure control value, or the auto focus control value output from the imaging apparatus main body to the imaging control unit of the camera module becomes abnormal under the influence of noise, the imaging unit does not output the imaging signals indicative of the frame images under incorrect white balance, exposure, or focus.

According to the fourth aspect of the invention, the imaging control unit can control the imaging operation of the imaging unit according to the imaging control value input in time with the control speed of the imaging unit, in no synchronization with the input cycle of the imaging control value.

According to the fifth aspect of the invention, it is possible to output a video less influenced by noise even when the camera module and the imaging apparatus main body are connected by the LVDS cable in the space of a vehicle with frequent occurrence of large noise.

According to the sixth aspect of the invention, the image signal processing unit is not included in each of the plurality of camera modules, thereby making it possible to obtain the entire video imaging apparatus composed of the plurality of camera modules at less expensive costs.

It is also possible to output the video obtained by compositing the motion images of the periphery of the vehicle in different imaging fields of view.

DESCRIPTION OF EMBODIMENTS

Figure 1:
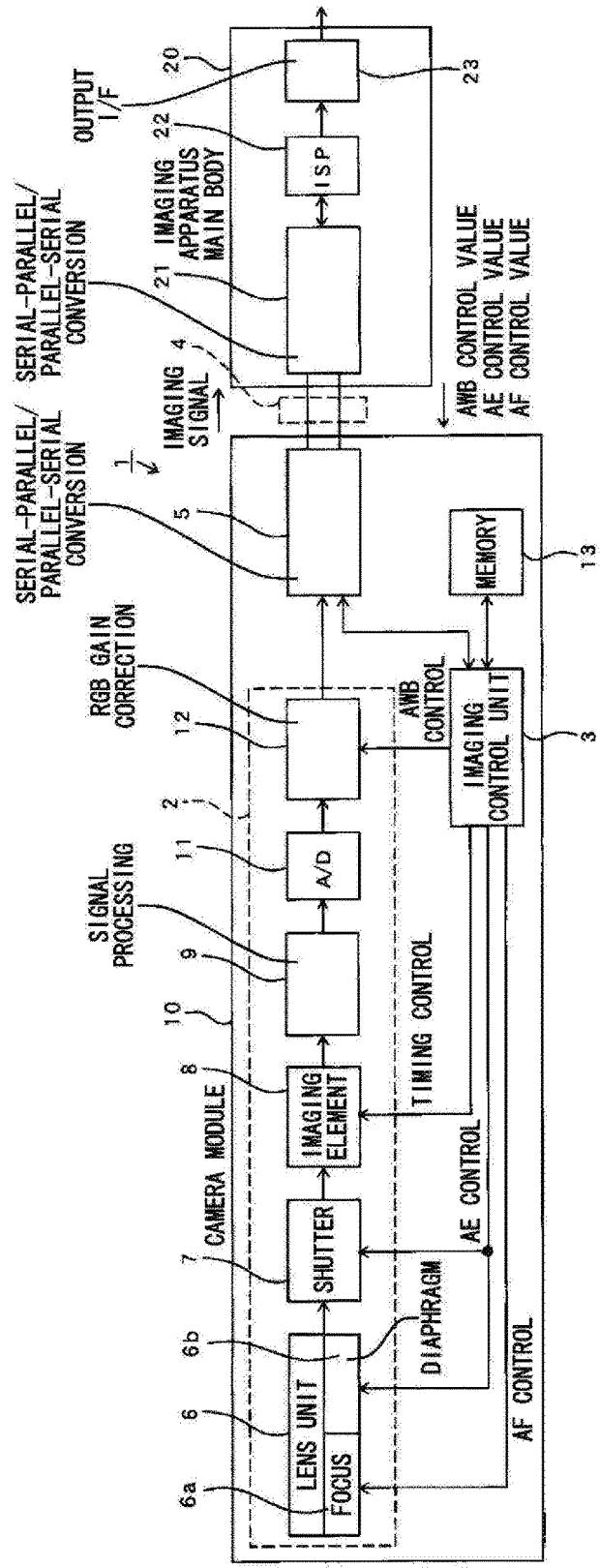
FIG. 1 is a block diagram of a video imaging apparatus 1 according to an embodiment of the present invention.

A video imaging apparatus 1 according to an embodiment of the present invention will be explained below with reference to FIG. 1. As illustrated in FIG. 1, the video imaging apparatus 1 includes: a camera module 10 in which an imaging unit 2, an imaging control unit 3, a storage unit 13, and a serial-parallel/parallel-serial conversion unit 5 are connected together by an interval bus; an imaging apparatus main body 20 in which a serial-parallel/parallel-serial conversion unit 21, an ISP (image signal processor) 22 as an image signal processing unit, and a video output unit 23 are connected together by an internal bus; and a LVDS (low voltage differential signaling) cable 4 as a connection cable for connecting the camera module 10 and the imaging apparatus main body 20.

The imaging unit 2 of the camera module 10 images a video in an imaging field of view and outputs imaging signals indicative of frame images of the video sequentially as a stream to the serial-parallel/parallel-serial conversion unit 5 as a serializer. The imaging unit 2 is composed of a lens 6 having a focus unit 6a and a diaphragm unit 6b, an electronic shutter 7, an imaging element 8, a signal processing circuit 9, an A/D conversion circuit 11, and an RGB gain correction circuit 12.

The focus unit 6a of the lens 6 has a focus lens and adjusts an optical path passing through the lens 6 such that the imaged video forms an image on the imaging element 8 according to an AF control signal output from the imaging control unit 3 as described later. The diaphragm unit 6b adjusts the amount of light entering the imaging element 8 through the lens 6 in conjunction with the electronic shutter 7 according to an AE control signal output from the imaging control unit 3 as described later.

The imaging element 8 is composed of a CMOS sensor as an assembly of large number of pixels and outputs signal load accumulated by a photo diode for each of the pixels as a pixel signal formed from a voltage signal. The operation of the imaging element 8 is controlled by a timing control signal output from the imaging control unit 3. The imaging element 8 takes frame images in the entire imaging field of view at an imaging cycle of one frame image of 1/30 second, that is, about 33 msec, and outputs all pixel signals indicative of one frame image as analog imaging signals to the signal processing circuit 9 in the following stage. The imaging element may be a CCD (charge coupled device) sensor.

The signal processing circuit 9 subjects the imaging signals to signal processing operations such as correlated double sampling (CDS) and separation into color signals of R, G, and B, and the A/D conversion circuit 11 converts the signals into digital signals and inputs the same into the RGB gain correction circuit 12. The RGB gain correction circuit 12 adjusts the levels of the color signals included in the imaging signals such that optimum color balance is reproduced under every light source, according to an AWB control signal output from the imaging control unit 3 as described later (white balance processing).

The RGB gain correction circuit 12 of the imaging unit 2 outputs sequentially the imaging signals indicative of the frame images of the video imaged at the cycle of about 33 msec to the serial-parallel/parallel-serial conversion unit 5. The serial-parallel/parallel-serial conversion unit 5 is an input/output interface that connects the camera module 10 to the imaging apparatus main body 20 via the LVDS cable 4 capable of bidirectional communication. The imaging signals from the imaging unit 2 are output as small-amplitude differential LVDS signals (constant-voltage differential signals) from the serial-parallel/parallel-serial conversion unit 5 as a serializer to the imaging apparatus main body 20. The imaging signals output from the imaging unit 2 via the LVDS cable 4 are unprocessed imaging data (raw data) before the creation of frame images of the full-color video by the ISP 22. Accordingly, the amount of communication data per unit time is smaller as compared to the case of outputting the frame images of the video via the LVDS cable 4, and the imaging signals can be output to the imaging apparatus main body 20 in a shorter time. Therefore, even when the LVDS cable 4 is laid in a noisy environment, the imaging signals are unlikely to be influenced by noise.

The LVDS cable 4 connecting the camera module 10 and the imaging apparatus main body 20 is a bidirectional serial transmission line. Via the LVDS cable 4, the imaging signals, imaging operation control information for the imaging unit 2, and various kinds of communication data indicating the operational status of the components in the camera module 10 and imaging control values of the imaging control signals for controlling the imaging operation of the imaging unit 2 superimposed on the imaging signals are transmitted from the camera module 10 to the imaging apparatus main body 20 in response to the request from the ISP 22. Also via the LVDS cable 4, communication data indicative of commands from the ISP 22 and imaging control values generated by the ISP 22 as described later are transmitted from the imaging apparatus main body 20 to the camera module 10.

The imaging control unit 3 controls the timings for the operations of the components in the camera module 10 such as the imaging unit 2 and the serial-parallel/parallel-serial conversion unit 5. The imaging control unit 3 also generates various imaging control signals including the AF control signal, the AE control signal, and the AWB control signal based on various imaging control values input from the ISP 22 of the imaging apparatus main body 20 via the LVDS cable 4 such as a focus control value (hereinafter, called AF control value), an exposure control value (hereinafter, called AE control value), and a white balance control value (hereinafter, called AWB control value), respectively, and controls the imaging operation of the imaging unit 2 according to these imaging control signals.

When controlling the imaging operation of the imaging unit 2 by the AF control signal, the AE control signal, and the AWB control signal, the imaging control unit 3 stores primarily the various imaging control values such as the AF control value, the AE control value, and the AWB control value used for the generation of the imaging control signals, in the storage unit 13 composed of an SDRAM. Each time the imaging control unit 3 generates newly an imaging control signal, the imaging control value stored in the storage unit 13 is replaced by the imaging control value used for the new imaging control signal.

The serial-parallel/parallel-serial conversion unit 21 as a de-serializer converts the imaging signals output from the imaging unit 2 of the camera module 10 to the imaging apparatus main body 20 via the LVDS cable 4 from serial signals to parallel signals, and inputs the same into the ISP 22.

With each input of the imaging signals indicative of one frame image, the ISP 22 performs mosaic processing on the pixels in the imaging signals to complement brightness and color-difference information based on the pixel signals of peripheral pixels to create the frame images of the video composed of YC (brightness and color difference) data as full-color image data in compliance with YUV 422. The ISP 22 also performs noise reduction, shading correction, contour enhancement, and application of various effects before and after the creation of the frame images.

The ISP 22 has an auto focus detection circuit that generates the AF control value from the imaging signals for the focused image; an auto exposure detection circuit that detects an exposure value from the imaging signals and outputs the exposure value as the AE control value as an optimum exposure value for clear image quality according to brightness in the imaging field of view; and an auto white balance detection circuit that generates the AWB control value from the imaging signals for optimum colors under a light source in the imaging field of view. With each input of the imaging signals indicative of one frame image, the ISP 22 outputs to the imaging control unit 3 the three kinds of imaging control values, that is, the AF control value, the AE control value, and the AWB control value via the serial-parallel/parallel-serial conversion unit 21, the LVDS cable 4, and the serial-parallel/parallel-serial conversion unit 5.

These imaging control values may be generated from the frame image created by the ISP 22 or at the time of generation of the imaging signals, when the imaging control values used for the imaging control signals for controlling the imaging operation of the imaging unit 2 are superimposed on the imaging signals and input from the camera module 10, the imaging signals may be generated taking the imaging control values into account.

The ISP 22 outputs the created frame images to the video output unit 23 at every imaging cycle of the imaging unit 2 of 1/30 second. The video output unit 23 outputs successively the frame images in a video format capable of being displayed on a monitor not illustrated, and outputs the motion images of the video imaged by the imaging unit 2 to a monitor not illustrated via an LVDS cable or the like.

The operation of the thus configured video imaging apparatus 1 will be explained below. Upon receipt of an imaging instruction from the ISP 22 of the imaging apparatus main body 20 via the LVDS cable 4, the imaging control unit 3 of the camera module 10 performs a boot-up process for the entire camera module 10, and controls the imaging operation of the imaging unit 2 by the imaging control signals based on the default imaging control values stored in the storage unit 13.

The imaging unit 2 images video in the imaging field of view by the imaging operation under control of the imaging control unit 3, generates repeatedly imaging signals indicative of one frame image at the imaging cycle of 1/30 second, and outputs the imaging signals indicative of the frame images to the ISP 22 of the imaging apparatus main body 20 via the LVDS cable 4.

The ISP 22 creates the frame images of the video from the input imaging signals and outputs the created frame images to the video output unit 23 at every 1/30 second. The video output unit 23 displays the imaged video on a connected monitor. With each creation of the frame image, the ISP 22 generates the three kinds of imaging control values, that is, the AF control value, the AE control value, and the AWB control value based on the input imaging signals, and outputs the same to the imaging control unit 3 of the camera module 10 via the LVDS cable 4.

With each input of the three kinds of imaging control values via the LVDS cable 4, the imaging control unit 3 reads the various imaging control values from the storage unit 13 for comparison with the new imaging control values.

The imaging control values stored in the storage unit 13 are values used for the generation of the imaging control signals for controlling the imaging operation of the imaging unit 2 immediately before the input of the new imaging control values from the ISP 22 via the LVDS cable 4. By comparing these imaging control values, it is possible to determine whether the input imaging control values are abnormal imaging control values under the influence of noise.

As the result of the comparison, when determining that the input imaging control values are abnormal imaging control values, the imaging control unit 3 ignores the imaging control values input via the LVDS cable 4, and generates the imaging control signals again based on the imaging control values stored in the storage unit 13 to control the imaging unit 2. Accordingly, even when the imaging signals and the imaging control values transmitted bi-directionally between the camera module 10 and the imaging apparatus main body 20 via the LVDS cable 4 become abnormal values under the influence of noise, the imaging operation of the imaging unit 2 is not controlled by the abnormal imaging control values. Therefore, the ISP 22 does not output the frame images with rapid changes in focus, exposure, white balance, and the like, and the video displayed on the monitor does not show the influence of simultaneous noise.

Meanwhile, when determining that the input imaging control values are not abnormal imaging control values under the influence of noise, the imaging control unit 3 generates the imaging control signals based on the imaging control values input via the LVDS cable 4 to control the imaging operation of the imaging unit 2. As a result, even with a change in the imaging environment, the imaging operation of the imaging unit 2 is controlled by the imaging control signals based on the optimum imaging control values.

The conditions for the imaging control unit 3 to determine whether the input imaging control values are abnormal imaging control values under the influence of noise are variable. For example, the imaging control unit 3 determines the imaging control values as abnormal when the input imaging control values fall outside a certain range or the differences from the imaging control values stored in the storage unit 13 are specific or larger values.

To allow the imaging unit 2 to be controlled by the imaging control signals based on the imaging control values such that the respective components of the communication path do not overflow with the various imaging control values generated by the ISP 22, the communication speeds in the respective components desirably satisfy the condition: the ISP 22 to the serial-parallel/parallel-serial conversion unit 21≤the serial-parallel/parallel-serial conversion unit 21 to the serial-parallel/parallel-serial conversion unit 5≤the serial-parallel/parallel-serial conversion unit 5 to the imaging control unit 3≤the imaging control unit 3 to the imaging unit 2. When the communication speed condition is not satisfied, the respective components are controlled such that the amounts of communication data satisfy the condition: the ISP 22 to the serial-parallel/parallel-serial conversion unit 21≥the serial-parallel/parallel-serial conversion unit 21 to the serial-parallel/parallel-serial conversion unit 5≥the serial-parallel/parallel-serial conversion unit 5 to the imaging control unit 3≥the imaging control unit 3 to the imaging unit 2.

For example, when the amount of data of the imaging control signals output from the imaging control unit 3 to the imaging unit 2 is larger than the amount of data of the imaging control values input from the serial-parallel/parallel-serial conversion unit 5 to the imaging control unit 3 at the cycle of 1/30 second (one-frame cycle), the amount of data of the imaging control signals is limited, some of the input imaging control values are ignored, and the imaging control signals are generated once at a two-frame cycle to control the imaging unit 2.

Figure 2:
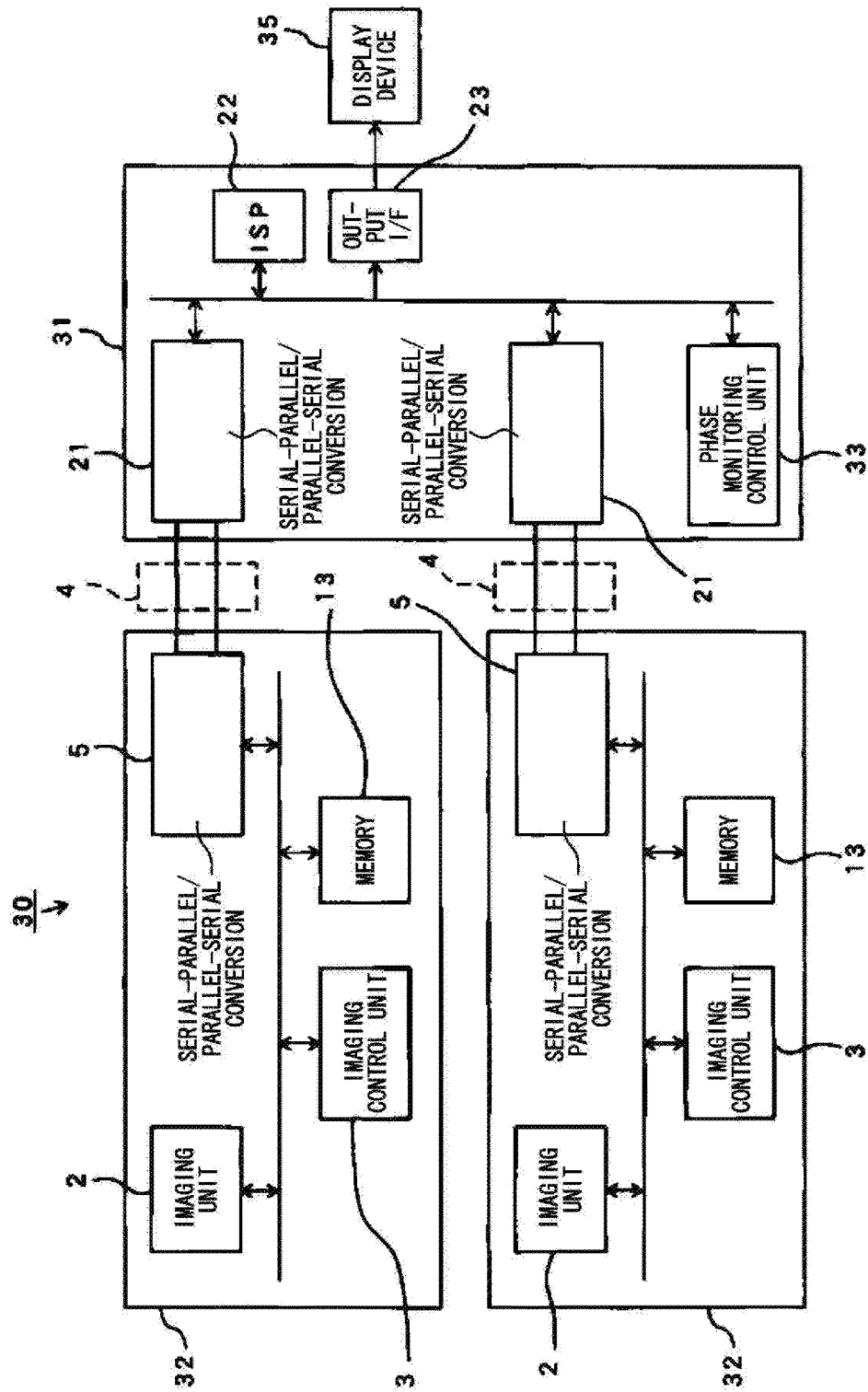
FIG. 2 is a block diagram of a video imaging apparatus 30 according to another embodiment in which a plurality of camera modules 32 and 32 is connected to an imaging apparatus main body 31.
Figure 3:
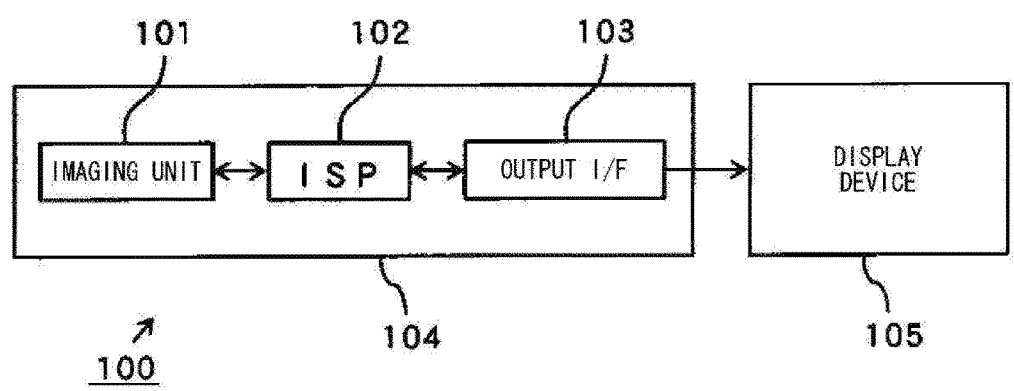
FIG. 3 is a block diagram of a typical video imaging apparatus 100.
Figure 4:
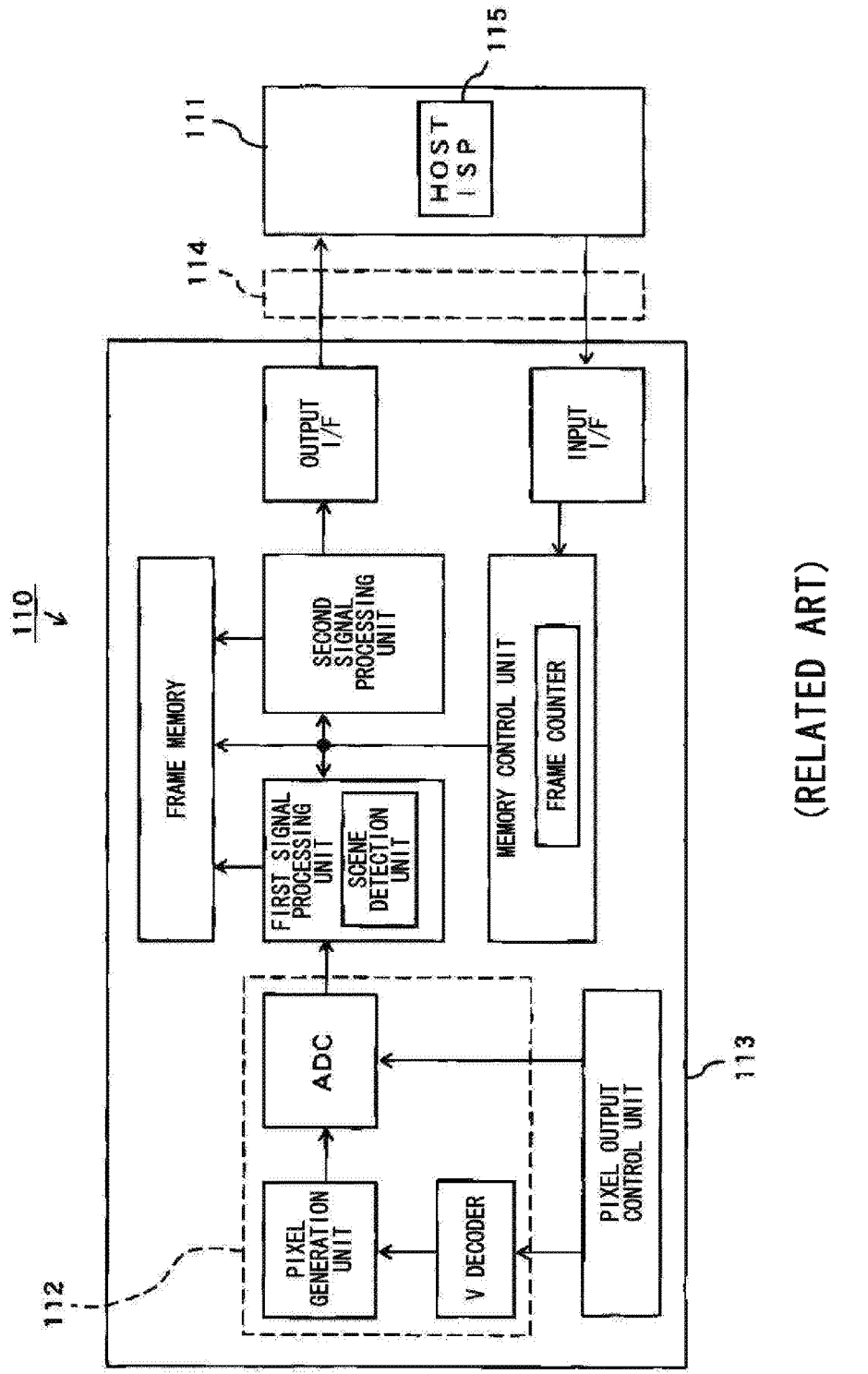
FIG. 4 is a block diagram of another typical video imaging apparatus 110.

FIG. 2 illustrates a video imaging apparatus 30 according to a second embodiment of the present invention. The video imaging apparatus 30 is different from the first embodiment in that one imaging apparatus main body 31 is connected to a plurality of camera modules 32 via LVDS cables 4. Nevertheless, the individual components operate identically or similarly to those of the first embodiment, and are given the same reference numbers without descriptions thereof.

The video imaging apparatus 30 is used in a drive assist system for the purposes of detecting an object approaching the vehicle at a high speed and taking measures to prevent accidents. As illustrated in FIG. 2, the adjacent camera modules 32 are installed at the respective parts of the vehicle to take images in different imaging fields of view that partly overlap. The camera modules 32 are connected via the LVDS cables 4 to the one imaging apparatus main body 31 disposed near a driver's seat monitor 35.

Accordingly, the imaging units 2 of the camera modules 32 capture imaging signals indicative of frame images of a video taken in the partially overlapping imaging fields of view at a rate of 30 frames/second, and output the same to an ISP 34 of the imaging apparatus main body 31 via the serial-parallel/parallel-serial conversion units 5, the LVDS cable 4, and the serial-parallel/parallel-serial conversion units 21.

The ISP 34 creates the frame images of the video imaged by the camera modules 32 from the imaging signals input from the camera modules 32, generates the three kinds of imaging control values, that is, the AF control value, the AE control value, and the AWB control value, and outputs the same to the imaging control units 3 of the camera modules 32 having output the imaging signals via the LVDS cables 4. Accordingly, the imaging operations of the imaging units 2 of the camera modules 32 are controlled by the optimum imaging control values suited to the changing imaging environments.

A phase monitoring control unit 33 of the imaging apparatus main body 31 performs a synchronization control on the frame images created in different phases by the ISP 34. The ISP 34 creates successively one frame image by compositing a plurality of frame images under the synchronization control, and outputs the same as a video from the video output unit 23 to the monitor 35.

According to the video imaging apparatus 30 of the embodiment, there is no need for providing the ISP (image signal processing unit) 34 with high performance to each of the plurality of camera modules 32, and therefore the entire apparatus can be manufactured at low costs.

When the imaging control values transmitted from the imaging apparatus main body 31 to the camera modules 32 via the LVDS cables 4 are influenced by noise, the imaging control signals are generated from the imaging control values stored in the storage unit 13. Accordingly, even when the LVDS cables 4 are connected in a vehicle with frequent occurrence of large noise, the composite video are reproduced on the monitor 35 with no influence of noise.

In the foregoing embodiments, the imaging control unit 3 generates the imaging control signals from the imaging control values such as the AF control value, the AE control value, and the AWB control value, and controls the operations of the components of the imaging unit 2 by the imaging control signals. Alternatively, the imaging operations of the components of the imaging unit 2 may be controlled by the imaging control values themselves as the imaging control signals.

The imaging control values are the three kinds of imaging control values, that is, the AF control value, the AE control value, and the AWB control values. Alternatively, the imaging control values may be one or two kinds of imaging control values, or may be control values for controlling another imaging operation of the imaging unit 2.

When the imaging control values input from the image signal processing unit are abnormal imaging control values under the influence of noise, the imaging control unit generates the imaging control signals by the imaging control values read from the storage unit instead of the abnormal imaging control values. Alternatively, while the abnormal imaging control values are input, the imaging operation of the imaging unit may not be controlled without generation of the imaging control signals.

The embodiments of the present invention are suited to a video imaging apparatus in which a camera module having an imaging unit and an imaging apparatus main body having an image signal processing unit are connected by a connection cable laid in a noisy environment.

The invention claimed is:

1. A video imaging apparatus comprising:
an imaging unit that images a video and outputs imaging signals indicative of frame images of the video in sequence as a stream;
an image signal processing unit that creates and outputs the frame images in sequence from the imaging signals and generates an imaging control value for controlling imaging operation of the imaging unit from the imaging signals; and
a video output unit that outputs to a monitor the video with a series of the frame images output in sequence from the image signal processing unit, wherein
a camera module includes the imaging unit and an imaging control unit that controls the imaging operation of the imaging unit according to the imaging control value,
an imaging apparatus main body connected to the camera module via a connection cable capable of bidirectional communication includes the image signal processing unit and the video output unit,
the imaging unit of the camera module outputs the imaging signals to be output in sequence to the image signal processing unit of the imaging apparatus main body via the connection cable, and
the imaging control unit of the camera module controls the imaging operation of the imaging unit according to the imaging control value output from the image signal processing unit of the imaging apparatus main body via the connection cable, wherein
the camera module includes a storage device that stores primarily the imaging control value with which operation of the imaging unit is controlled by the imaging control unit, and
when determining that the imaging control value output from the image signal processing unit via the connection cable indicates a rapid change in the imaging control value, the imaging control unit controls the imaging operation of the imaging unit according to the imaging control value read from the storage device, instead of the imaging control value.

2. The video imaging apparatus according to claim 1, wherein the imaging control value is at least one of an auto white balance control value, an auto exposure control value, and an auto focus control value.

3. The video imaging apparatus according to claim 1, wherein, when a plurality of imaging control values is input via the connection cable within a control cycle during which the imaging unit is controlled according to the imaging control value, the imaging control unit ignores some of the input imaging control values.

4. The video imaging apparatus according to claim 1, wherein the camera module installed at part of a vehicle for imaging the periphery of the vehicle and the imaging apparatus main body installed at the periphery of a monitor mounted around a driver's seat of the vehicle are connected together via a LVDS cable capable of bidirectional communication.

5. The video imaging apparatus according to claim 4, wherein the imaging units in a plurality of the camera modules installed at respective parts of the vehicle for imaging the periphery of the vehicle in different imaging fields of view are connected to the image signal processing unit of the imaging apparatus main body via the LVDS cables capable of bidirectional communication.

* * * * *